US009547433B1

(12) United States Patent
Feldstein et al.

(10) Patent No.: US 9,547,433 B1
(45) Date of Patent: Jan. 17, 2017

(54) SYSTEMS AND METHODS FOR CHANGING CONTROL FUNCTIONS DURING AN INPUT GESTURE

(71) Applicant: Google Inc., Mountain View, CA (US)

(72) Inventors: Michael Feldstein, Palo Alto, CA (US); Daniel Marc Gatan Shiplacoff, Los Altos, CA (US); Hector Ouilhet Olmos, Mountain View, CA (US)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 14/272,395

(22) Filed: May 7, 2014

(51) Int. Cl.
G06F 3/0488 (2013.01)
G06F 3/0481 (2013.01)
G06F 3/0484 (2013.01)
G06F 3/0485 (2013.01)

(52) U.S. Cl.
CPC .......... G06F 3/0488 (2013.01); G06F 3/0485 (2013.01); G06F 3/04817 (2013.01); G06F 3/04842 (2013.01); G06F 3/04845 (2013.01)

(58) Field of Classification Search
None
See application file for complete search history.

(56) References Cited

U.S. PATENT DOCUMENTS

| 8,055,664 | B2* | 11/2011 | Baluja | G06N 5/02 |
| | | | | 705/14.7 |
| 8,346,864 | B1* | 1/2013 | Amidon | H04L 65/1069 |
| | | | | 709/204 |
| 8,676,909 | B2* | 3/2014 | Guyot | H04L 12/585 |
| | | | | 705/319 |
| 2008/0165142 | A1* | 7/2008 | Kocienda | G06F 3/04886 |
| | | | | 345/173 |
| 2010/0169766 | A1* | 7/2010 | Duarte | G06F 3/04883 |
| | | | | 715/244 |
| 2010/0241713 | A1* | 9/2010 | Shimizu | G06Q 50/00 |
| | | | | 709/206 |
| 2010/0306271 | A1* | 12/2010 | Shmueli | G06F 17/30545 |
| | | | | 707/798 |
| 2011/0202606 | A1* | 8/2011 | Agarwal | H04L 12/1859 |
| | | | | 709/206 |
| 2011/0314429 | A1 | 12/2011 | Blumenberg | |
| 2012/0062604 | A1* | 3/2012 | Lobo | G06F 3/0485 |
| | | | | 345/684 |

(Continued)

Primary Examiner — Phenuel Salomon
(74) Attorney, Agent, or Firm — Troutman Sanders LLP; James E. Schutz; Christopher W. Glass

(57) ABSTRACT

The disclosed technology includes using horizontal components and vertical components of a velocity vector associated with movement of an input gesture to determine a user's intended, dominant direction of movement and corresponding control function at various points during the input gesture. Thresholds may be dynamically adjusted to prevent a user from unintentionally changing control functions during the input gesture. By adjusting the sensitivity associated with changes in a direction of movement of a continuous input gesture, it can be made effectively more difficult for the user to unintentionally cause a change in control functions. In example implementations, one or more thresholds associated with changing a control function may be increased or decreased during a continuous input gesture. For example, the thresholds may be increased or decreased in proportion to an increase or decrease in a velocity vector component.

27 Claims, 10 Drawing Sheets

(56) References Cited

U.S. PATENT DOCUMENTS

| | | | |
|---|---|---|---|
| 2013/0033525 A1* | 2/2013 | Markiewicz | G06F 3/0485 345/684 |
| 2013/0106744 A1 | 5/2013 | Asakura | |
| 2013/0169424 A1 | 7/2013 | Kujawski et al. | |
| 2013/0176243 A1 | 7/2013 | BianRosa et al. | |
| 2014/0053113 A1* | 2/2014 | Zoon | G06F 3/017 715/863 |
| 2014/0109016 A1* | 4/2014 | Ouyang | G06F 17/24 715/856 |
| 2014/0201666 A1* | 7/2014 | Bedikian | G06F 3/017 715/771 |
| 2015/0100911 A1* | 4/2015 | Yin | G06F 3/04883 715/773 |

* cited by examiner

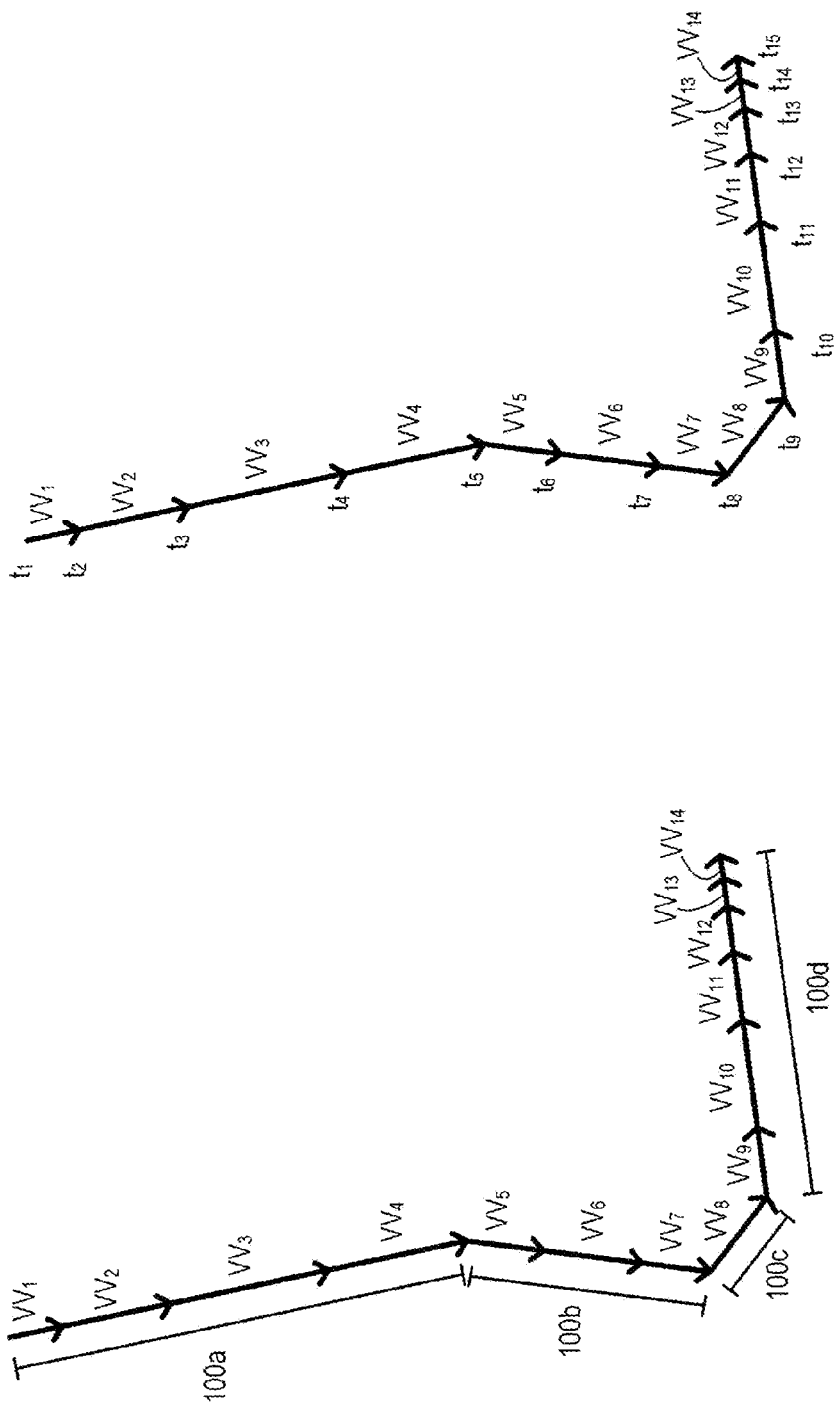

SYSTEMS AND METHODS FOR CHANGING CONTROL FUNCTIONS DURING AN INPUT GESTURE

BACKGROUND

A computing device may perform one or more control functions for a user, thereby allowing the user to interact with the computing device. For example, control functions may include scrolling displayed content that includes text or images, navigating through selections in a displayed list of menu items, relocating one or more displayed objects, or various actions that require use of a cursor or other tool for selecting and/or acting upon certain objects. While using some computing devices, a user may employ an input object (such as a stylus or the user's finger or hand) to perform an input gesture to cause the computing device to perform a control function. Such input gestures may include a directional interaction such as a slide gesture performed at an input device associated with the computing device (e.g., a presence-sensitive input device such as a touch pad, track pad, or touchscreen).

Some approaches to direction-based control functions may require that a user must stop a first input gesture before he or she can effectively change control functions by performing a second input gesture. For example, the user may be required to stop a slide gesture in a first direction of movement by removing an input object from the input device, and then perform a second input gesture in order to cause a control function to be performed in accordance with a second direction of movement of the second input gesture. Such approaches may therefore not allow for the seamless switching of control functions during an input gesture.

Further, some users may perform an input gesture in a direction of movement that is unintentionally not aligned with a particular axis. (More specifically, the movement of such input gestures may slightly deviate from an intended direction at one or more points.) In some such systems, such slight deviations from a predetermined path may cause the system to incorrectly interpret the deviation as an intention by the user to change control functions, resulting in performance by the system of one or more control functions that may not be consistent with the user's intentions.

SUMMARY

Some or all of the above needs may be addressed by certain implementations of the disclosed technology. Certain implementations may include methods, systems, and non-transitory computer-readable medium for changing control functions during an input gesture.

According to an example implementation, a method is provided. The method may include, responsive to receiving, at a computing device, an indication of an input gesture in a first direction of movement, determining, by the computing device, a first component value corresponding to a first predetermined component of a velocity vector associated with the input gesture. The method may also include, responsive to determining, by the computing device, that the first component value exceeds a first threshold value associated with a dominant direction of movement, initiating, by the computing device, a first control function. The method may also include determining, by the computing device, a second component value corresponding to a second predetermined component of the velocity vector associated with the input gesture.

The method may also include, responsive to receiving, at the computing device, an indication that the input gesture has changed from the first direction of movement to a second direction of movement, determining, by the computing device, that the second component value exceeds a second threshold value associated with movement in a non-dominant direction of movement, wherein the second threshold value is higher than the first threshold value. The method may also include, responsive to determining, by the computing device, that the second component value exceeds the second threshold value, initiating, by the computing device, a second control function.

According to another example implementation, a system is provided. The system may include one or more processors and a memory coupled to the one or more processors. The memory may store instructions that, when executed by the one or more processors, cause the system to perform functions that include, responsive to receiving an indication of an input gesture in a first direction of movement, determining a first component value corresponding to a first predetermined component of a velocity vector associated with the input gesture. The memory may also store instructions that, when executed by the one or more processors, cause the system to, responsive to determining that the first component value exceeds a first threshold value associated with a dominant direction of movement, initiate a first control function, and to determine a second component value corresponding to a second predetermined component of the velocity vector associated with the input gesture. The memory may also store instructions that, when executed by the one or more processors, cause the system to, responsive to receiving an indication that the input gesture has changed from the first direction of movement to a second direction of movement, determine that the second component value exceeds a second threshold value associated with movement in a non-dominant direction of movement, wherein the second threshold value is higher than the first threshold value. The memory may also store instructions that, when executed by the one or more processors, cause the system to, responsive to determining that the second component value exceeds the second threshold value, initiate a second control function.

According to another example implementation, a non-transitory computer-readable medium is provided. The computer-readable medium may store instructions that, when executed by one or more processors, cause a computing device to, responsive to receiving an indication of an input gesture in a first direction of movement, determine a first component value corresponding to a first predetermined component of a velocity vector associated with the input gesture. The computer-readable medium may also store instructions that, when executed by the one or more processors, cause the computing device to, responsive to determining that the first component value exceeds a first threshold value associated with a dominant direction of movement, initiate a first control function, and to determine a second component value corresponding to a second predetermined component of the velocity vector associated with the input gesture.

The computer-readable medium may also store instructions that, when executed by the one or more processors, cause the computing device to, responsive to receiving an indication that the input gesture has changed from the first direction of movement to a second direction of movement, determine that the second component value exceeds a second threshold value associated with movement in a non-dominant direction of movement, wherein the second threshold value is higher than the first threshold value. The computer-readable medium may also store instructions that, when executed by the one or more processors, cause the computing device to, responsive to determining that the second component value exceeds the second threshold value, initiate a second control function.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIGS. 2A-2D illustrate velocity vectors corresponding to movement of an input gesture, according to an example implementation.

DETAILED DESCRIPTION

Figure 1:
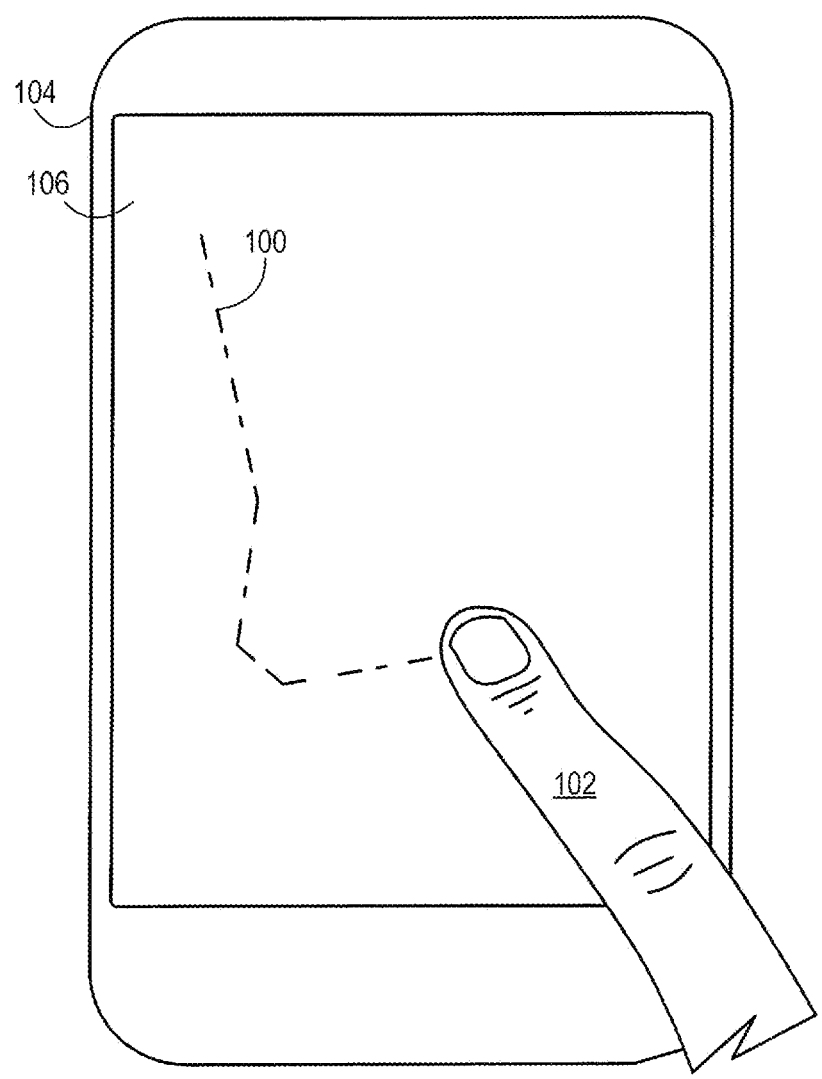
FIG. 1 illustrates a user input gesture for causing a computing device to perform control functions, according to an example implementation.

According to example implementations of the disclosed technology, a computing device may determine components of a velocity vector associated with movements of an input gesture. More specifically, the computing device may determine vertical and horizontal component values associated with the velocity vectors. Based on the component values, the computing device may initiate and/or perform control functions for user interaction with displayed content. Such control functions may include scrolling content with text or images, navigating through selections in a displayed list of menu items, moving one or more displayed objects, or various actions that require use of a cursor or other tool for selecting or acting upon certain objects.

As briefly discussed above, a user may perform an input gesture in a manner that is (unintentionally) not perfectly aligned with a particular path, or a particular axis. The input gesture may deviate in direction at one or more points. For example, while a user moves his or her finger along a touchscreen or touchpad as a slide gesture in a direction that is primarily aligned with the x-axis (i.e., towards the right or left), although the user may intend to move his or her finger along a perfectly horizontal path, a velocity vector associated with the slide gesture may also have a non-zero vertical component. In other words, the direction of movement may be partially vertical.

According to example implementations of the disclosed technology, thresholds may be dynamically adjusted to prevent a user from unintentionally changing control functions during an input gesture. By adjusting the sensitivity associated with changes in direction during a continuous input gesture, it can be made effectively more difficult for the user to unintentionally cause a change in control functions. In example implementations, one or more thresholds associated with changing a control function may be increased or decreased during an input gesture. One or more threshold values may be changed in accordance with various components of the velocity vector associated with an input gesture. For example, a threshold value may be increased or decreased based on vertical and/or horizontal components of the velocity vector. Thresholds may be increased or decreased in proportion to an increase or decrease in a velocity vector component.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some implementations of the disclosed technology will be described more fully hereinafter with reference to the accompanying drawings. This disclosed technology may, however, be embodied in many different forms and should not be construed as limited to the implementations set forth herein.

FIG. 1 illustrates movement of a continuous user input gesture for causing a computing device 104 to perform control functions, according to an example implementation. The computing device 104 includes a presence-sensitive input device 106, which may be a touchscreen or a touchpad. The computing device 104 may include one or more components of the computing device architecture shown in FIG. 5. In an example implementation, the computing device 104 may be a dedicated control device for allowing a user to remotely control actions performed on a remote computing device, or the computing device 104 may be an electronic communication device such as a smartphone. Although its direction of movement deviates in direction at various points throughout, the input gesture may be performed in a continuous manner, i.e., with constant movement, by a user's finger 102 at the presence-sensitive input device 106.

The input gesture shown in FIG. 1 is a continuous input gesture that follows a path 100 visually marked in FIG. 2A as including sections 100a, 100b, 100c, and 100d. It should be recognized that these sections are provided merely for reference purposes to the reader of the present Application, and not to indicate or suggest that the input gesture is performed in an interrupted or segmented manner. Rather, in example implementations described herein with respect to FIGS. 1-4, the input gesture is performed in an uninterrupted, continuous manner, and the periods of time associated with sections 100a, 100b, 100c, and 100d are contiguous. As discussed further below with respect to an example implementation shown in FIGS. 4A-4C, the example input gesture of FIG. 1 may reflect a user's intention to cause a computing device to perform a first control function in accordance with sections 100a-100c of the input gesture, followed by a second control function in accordance with section 100d of the input gesture.

The input gesture has a velocity of movement that can be described in terms of a corresponding velocity vector. The velocity vector may be described in terms of its components along the x-axis ($vv_x$, also referred to herein as a horizontal component) and its velocity component along the y-axis ($vv_y$, also referred to herein as the vertical component). As shown, the input gesture 100 has multiple associated velocity vectors $vv_1$-$vv_{14}$, each of which has a respective magnitude and direction. Velocity vectors $vv_1$-$vv_4$ correspond to section 100a of the input gesture 100, velocity vectors $vv_5$-$vv_7$ correspond to section 100b, velocity vector $vv_8$ corresponds to section 100c, and velocity vectors $vv_9$-$vv_{14}$ correspond to section 100d. The relative magnitude of each velocity vector shown in FIGS. 2A-2B is visually represented by the relative length of its respective arrow. For instance, the absolute velocity corresponding to velocity vector $vv_3$ is greater than that of velocity vector $vv_1$ and, accordingly, the arrow representing velocity vector $vv_3$ is longer than the arrow representing velocity vector $vv_1$. Similarly, the absolute velocity corresponding to velocity vector $vv_{13}$ is less than that for velocity vector $vv_{11}$ and, accordingly, the arrow for velocity vector $vv_{13}$ is shorter than the arrow for velocity vector $vv_{13}$.

Figure 2D:
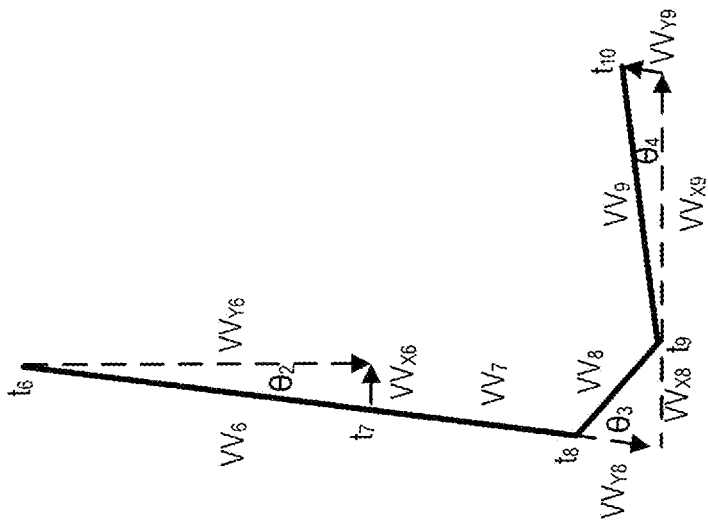
Figure 2C:
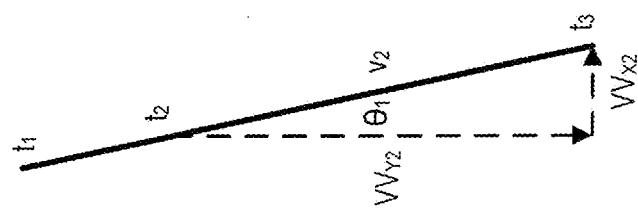

For illustrative purposes, velocity vector $vv_2$ is shown in FIG. 2C with its horizontal and vertical components ($vv_{2x}$ and $vv_{2y}$, respectively). Also, velocity vectors $vv_6$, $vv_7$, $vv_8$, and $vv_9$ are shown in FIG. 2D according to their respective horizontal and vertical components, in particular $vv_{6x}$ and $vv_{6y}$ for velocity vector $vv_6$; $vv_{7x}$ and $vv_{7y}$ for velocity vector $vv_7$; $vv_{8x}$ and $vv_{8y}$ for velocity vector $vv_8$; and $vv_{9x}$ and $vv_{9y}$ for velocity vector $vv_9$. For section 100a, the input gesture has an increasing velocity (i.e., acceleration) from time $t_1$-$t_4$, then a decreasing velocity (i.e., deceleration) from time $t_4$ to $t_6$. The direction of movement associated with the input gesture slightly shifts at approximately $t_5$, although, as shown in FIGS. 2C and 2D, the direction of movement remains vertical-dominant. However, the dominant direction of movement of the input gesture changes at approximately $t_9$. As reflected by the decreasing length of the vector arrows $vv_6$-$vv_8$ from time $t_6$ to $t_9$, the velocity decreases from $t_6$ to $t_9$ and then the dominant direction of movement transitions (between $t_8$ and $t_9$) from vertical to horizontal. The input gesture then continues, accelerating in the horizontal direction, as represented by the increasing length of arrows representing $vv_9$-$vv_{10}$ from $t_9$ to $t_{11}$.

Horizontal components and vertical components of the velocity associated with movement of the input gesture may be utilized to determine a dominant direction of movement during the input gesture. In example implementations, determining a user's intended primary (dominant) direction of movement and, accordingly, a user's intended control function, may be performed by comparing components of one or more velocity vectors associated with an input gesture to predetermined thresholds. The input gesture is performed such that the vertical direction is the dominant direction of movement for section 100a. This may be determined by a computing device (e.g., computing device 104 in FIG. 1 and/or computing device 400 in FIGS. 4A-4C) by comparing the values of the vertical components for one or more of velocity vectors $vv_1$-$vv_4$ to a predetermined threshold value and, if the respective component value exceeds the predetermined threshold value, determining that the direction of movement is vertical-dominant. Values of the horizontal components for one or more of velocity vectors $v_1$-$v_4$ may also be compared to one or more predetermined threshold values.

As an example, a predetermined threshold value associated with a dominant direction of movement may be 0.10, and velocity vector $vv_2$ may have an absolute magnitude v of 0.2 m/s and a direction corresponding to $\theta_1 = 105$ degrees respective to the x-axis (see FIG. 2C). Accordingly, the vertical component of velocity vector $vv_2$ ($vv_{2y} = v \sin \theta_1$) is 0.2 sin 105=0.19, which exceeds the predetermined threshold value of 0.1, and therefore the direction of movement is determined to be vertical-dominant. In this example, the horizontal component of velocity vector $vv_2$ ($vv_{2x} = v \cos \theta_1$) is 0.2 cos 105=−0.05. In this example and in other example implementations described herein, a comparison to a threshold value may be determined using an absolute value of the component value or threshold value. In the instant example, the absolute value of −0.05 for the horizontal component of $vv_2$ is 0.05, which falls below the required threshold value of 0.1, thus indicating that the dominant direction of movement associated with velocity vector $vv_2$ is not horizontal-dominant. The specific direction of movement for the dominant direction of movement (for instance, to the right, left, up, or down) may be determined with the determination on whether a component value exceeds the threshold value associated with a dominant direction, for example according to the component value being positive or negative.

It will be appreciated that a metric associated with a threshold and/or a threshold "value" as referred to herein in describing one or more example implementations is not limited to a specific form of value, unit, or scale. For example, a threshold value may not necessarily be limited to a numeric value such as an integer. A threshold value as described herein may additionally or alternatively be characterized and considered in terms of ratios, percentages, portions, etc.

As shown, section 100d of the input gesture has a horizontal-dominant direction of movement. This may be determined by a computing device by comparing the values of the vertical components for one or more of velocity vectors $vv_9$-$vv_{14}$ to a respective predetermined threshold value and, if the respective component value exceeds the respective predetermined threshold value, determining that the direction of movement is horizontal-dominant. Values of the vertical components for one or more of velocity vectors $vv_9$-$vv_{14}$ may also be compared to a predetermined threshold value. In the case of velocity vectors $vv_9$-$vv_{14}$, it may be determined that values of the vertical components for one or more of these velocity vectors do not exceed a predetermined threshold value associated with a dominant direction of movement.

As an example, a predetermined threshold value associated with a dominant direction of movement may be 0.15. Velocity vector $vv_9$ may have an absolute magnitude v of 0.3 m/s and a direction corresponding to $\theta_4=15$ degrees with respect to the x-axis (see FIG. 2D). Accordingly, the value of the horizontal component of velocity vector $vv_9$ ($vv_{9x}=v \cos \theta_4$) is 0.3 cos 15=0.29, which exceeds a predetermined threshold value of 0.15, and therefore the direction of movement is determined to be horizontal-dominant. In this example, the value of the vertical component of velocity vector $vv_9$ ($vv_{9y}=v \sin \theta_4$) is 0.3 sin 15=0.08, which falls below the threshold value of 0.15, thus indicating that the direction of movement is not vertical-dominant.

If neither the horizontal component nor the vertical component exceeds one or more requisite threshold values, then the dominant direction and corresponding control function may remain the same as the dominant direction and corresponding control function for one or more velocity vectors at one or more previous points in time during the input gesture. As shown in FIG. 2D, velocity vector $vv_8$ (section 100c of the input gesture), is directed downwards and to the right at an angle $\theta_3$. The angle $\theta_3$ may be, for example, 45 degrees with respect to the x-axis. The velocity vector $v_8$ for section 100c of the input gesture therefore has equal horizontal and vertical components. The horizontal component $vv_{9x}$ and/or the vertical component $vv_{9y}$ may therefore not exceed a respective predetermined threshold value for a dominant direction of movement. In such a case, a computing device may determine that the dominant direction of movement and corresponding control function should remain the same as the dominant direction of movement and corresponding control function for a previous one or more points during the input gesture. For example, section 100c of the input gesture is preceded by section 100b, and the velocity vectors of section 100b correspond to a vertical-dominant direction of movement, as discussed above. Therefore, the dominant direction of movement and corresponding control function for section 100c may be kept the same as those for section 100b (i.e., vertical-dominant).

In one or more example implementations, a certain margin may be set for indicating a dominant direction. A component value may be required to differ from (e.g., exceed) a predetermined threshold value by a certain amount, ratio, percentage, portion, etc. in order for a determination to be made as to the dominant direction of movement and corresponding control function, or in order to determine that the dominant direction of movement and corresponding control function should be changed from a previously established dominant direction of movement and control function to another dominant direction and control function. For example, a component value may be required to exceed a predetermined threshold value by 20% in order for the dominant direction of movement and corresponding control function to be changed from a first direction and first control function to a second direction and second control function.

Figure 3A:
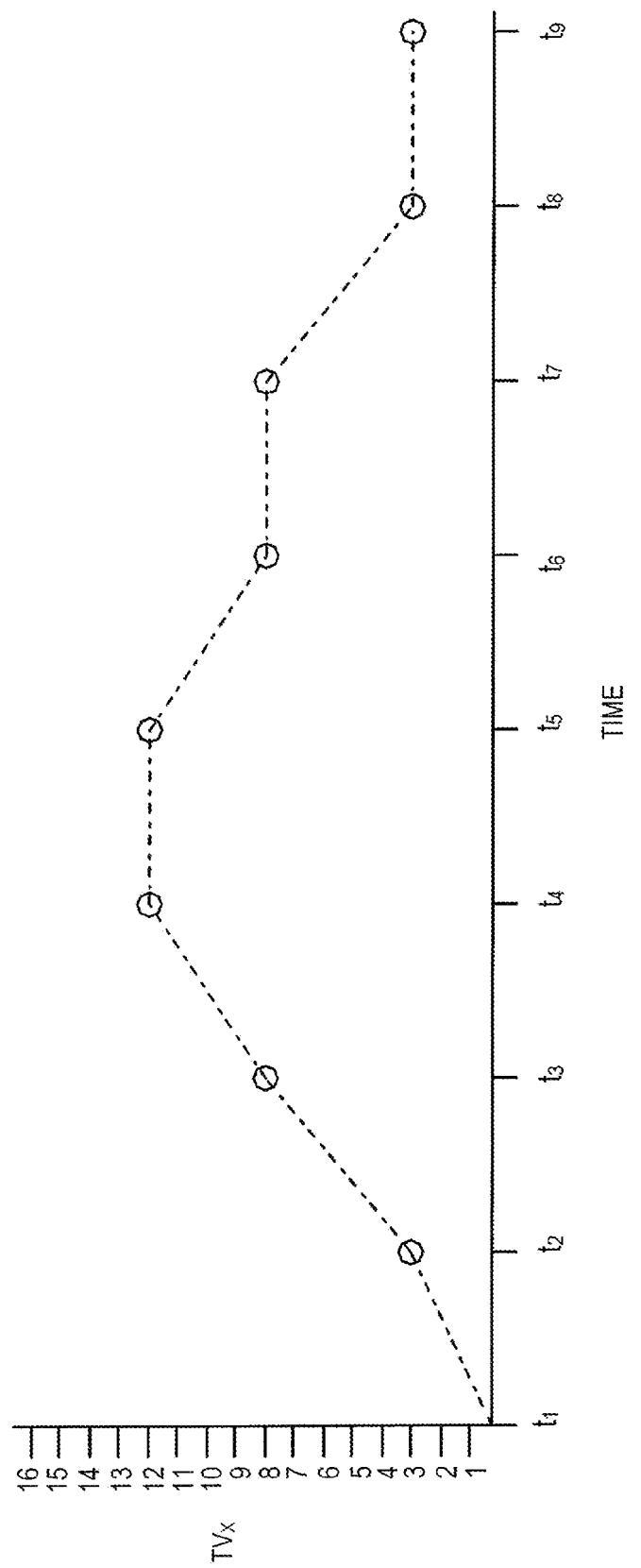
FIGS. 3A and 3B illustrate dynamic adjustment of thresholds for changing control functions during an input gesture, according to an example implementation.
Figure 3B:
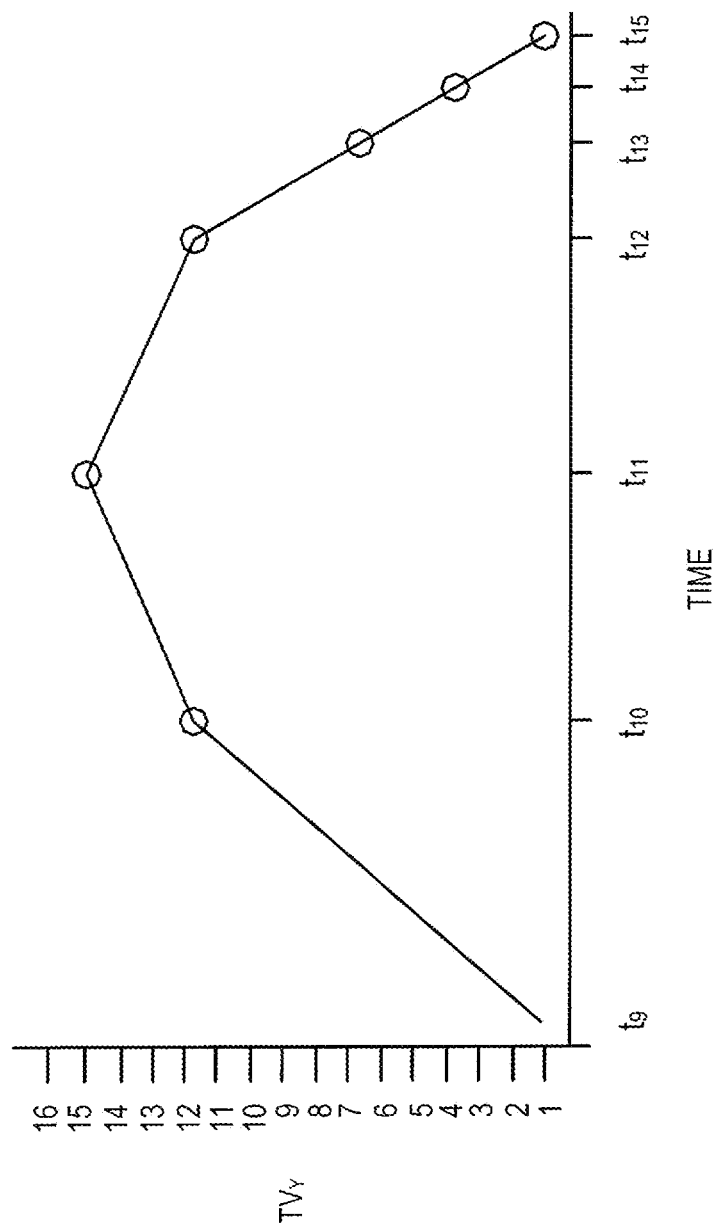

Now referring to FIGS. 3A and 3B, according to example implementations of the disclosed technology, thresholds may be dynamically adjusted to prevent a user from unintentionally changing control functions during an input gesture. By adjusting the sensitivity associated with changes in a direction of movement of a continuous input gesture, and corresponding changes in a user's intended control function, it can be made effectively more difficult for the user to unintentionally cause a change in control functions during an input gesture. In example implementations, one or more thresholds associated with changing a control function may be increased or decreased during an input gesture. One or more threshold values ("TV") may be changed in accordance with various components associated with a velocity of movement of an input gesture. For example, a threshold value may be increased or decreased based on vertical and/or horizontal components of one or more velocity vectors associated with the input gesture. Thresholds may be increased or decreased in proportion to an increase or decrease in a component. A user may successfully cause a change in control functions during an input gesture, provided that a certain component value of one or more velocity vectors associated with the input gesture exceeds the threshold value required for changing to a different dominant direction. The dynamic adjustment of the thresholds, in accordance with example implementations, can effectively require a user to be more deliberate in order to clearly indicate a desire to cause a change from one control function to another, as it requires him or her to significantly change a direction and magnitude of an input object's movement while the input gesture is being performed.

In example implementations, a user may perform an input gesture in a horizontal-dominant direction, and a computing device may perform a corresponding first control function accordingly. A horizontal velocity component value and/or vertical velocity component value may increase or decrease during the input gesture, as the absolute velocity of the input gesture increases or decreases, respectively. A threshold value required for changing control functions from the first control function to a second control function may be dynamically increased or decreased accordingly, during the input gesture. The threshold value may be increased or decreased by a pre-set amount (or percentage, portion, ratio, etc.), or may be increased or decreased in proportion to the amount (or percentage, portion, ratio, etc.) of the increase or decrease in the vertical component, over one or more specific periods of time during the input gesture. For example, if an input gesture is performed such that the direction at a first point in time is horizontal-dominant, then as the absolute velocity and corresponding horizontal component of the associated velocity vector increases over a period of time between a first point in time and a second point in time during the input gesture, a threshold value required for changing to a vertical-dominant direction may be increased. The threshold value may be increased by a pre-set amount (or percentage, portion, ratio, etc.) or it may be increased in proportion to the increase in the horizontal component from the first point in time to the second point in time. The threshold value may be increased at the second point in time, for example. Likewise, when a velocity component of the input gesture in the dominant direction decreases, the threshold value required for changing to a different dominant direction may be decreased by a pre-set amount (or percentage, portion, ratio, etc.) or it may be decreased in proportion to the decrease in the horizontal component.

In example implementations, if an input gesture is performed in a vertical-dominant direction, then as a vertical component of one or more velocity vectors associated with the input gesture increases or decreases during the input gesture, a threshold value $TV_x$ required for changing to a horizontal-dominant direction may be increased or decreased in response. Also, in example implementations, if an input gesture is performed in a horizontal-dominant direction, then as a horizontal component of one or more velocity vectors associated with the input gesture increases or decreases during the input gesture, a threshold value $TV_y$ required for changing to a horizontal-dominant direction may be increased or decreased in response. The adjustment may be proportional to the magnitude, factor, etc. of the change in the respective component values of the associated one or more velocity vectors (i.e., proportional to the change in components of an increasing or decreasing velocity of the input gesture) or may be adjusted according to pre-set amounts. Furthermore, the adjustments may be performed gradually, in a continuous manner, or at periodic intervals, for example.

Sections 100a, 100b, and 100c of the input gesture each correspond to a vertical-dominant direction of movement for the time period $t_1$-$t_9$. The vertical component of a velocity vector associated with the input gesture 100 increases from time $t_1$ to time $t_4$ (section 100a), so the threshold value $TV_x$ required for changing the dominant direction from vertical-dominant to horizontal-dominant is increased accordingly. This relationship is visually represented in the plot shown in FIG. 3A. In particular, FIG. 3A shows that $TV_x$ increases from 0 to 3 over the time period $t_1$-$t_2$, increases from 3 to 8 over time period $t_2$-$t_3$, and increases from 8 to 12 over the time period $t_3$-$t_4$. As a result, in order to cause a change in control functions during this period of time, an input gesture would have to have been performed in a manner such that a horizontal velocity component is greater than it would need to be at time $t_1$, that is, at the beginning of the input gesture.

From time $t_4$ to $t_5$, the vertical component of the velocity vector associated with the input gesture remains the same, so the threshold value $TV_x$ required for changing from a vertical-dominant direction to a horizontal-dominant direction may also remain the same. Particularly, as shown in FIG. 3A, $TV_x$ remains at 12 for the time period $t_4$-$t_5$. As a result, in order to cause a change in control functions during the period of time from $t_4$ to $t_6$, by exceeding the respective threshold value(s), the input gesture could be performed such that a horizontal velocity component is less than it would need to be at, for instance $t_3$, but the horizontal velocity component would still need to be greater than that for $t_1$ and $t_2$. As shown in FIG. 2, the direction of the input gesture slightly shifts towards the left between $t_4$ and $t_6$, and accordingly, the horizontal velocity component decreases in magnitude. However, as discussed above with respect to FIG. 2, the dominant direction associated with the input gesture between $t_4$ and $t_6$ remains the same as that for the previous points $t_1$-$t_3$ (i.e., it remains vertical-dominant). Therefore, the control function performed by a computing device in response remains the same as that performed for one or more previous points in time.

It will be appreciated that in this case, the threshold value for changing the dominant direction to be horizontal-dominant, coinciding with the horizontal directional shift, will correspond to a change in dominant direction that is towards the left (rather than towards the right as in the previous points in time during the input gesture). Over the time period $t_5$-$t_6$, the vertical component of the velocity vector associated with the input gesture decreases, so the threshold value $TV_x$ for changing from a vertical-dominant direction to a horizontal-dominant direction is decreased (lowered) accordingly, from 12 to 8. Over the time period $t_6$-$t_7$, the vertical component remains the same as that for $t_5$-$t_6$, so the threshold value $TV_x$ also remains the same. The vertical component of the velocity vector decreases over $t_7$-$t_8$, and the threshold value $TV_x$ is decreased from 8 to 3.

Now referring to section 100c of the input gesture, as shown in FIG. 2 and discussed above, the dominant direction of movement associated with the input gesture changes at approximately $t_9$, with a transition from a vertical-dominant direction to a horizontal-dominant direction. The corresponding velocity vector $v_8$ may have equal vertical and horizontal component values. In the example implementation shown in FIGS. 1 and 2, the threshold value $TV_x$ for changing from a vertical-dominant direction to a horizontal-dominant direction at approximately $t_9$ may be adjusted to or pre-set such that although a corresponding velocity vector has equal vertical and horizontal component values, the dominant direction may remain as that of the dominant direction for previous points in time (i.e., vertical-dominant). In an example implementation, as shown in the visual representation in FIG. 3A, $TV_x$ remains at 3 over the time period $t_8$-$t_9$. In this case, deference may be given to the previous dominant direction because all of the preceding velocity vectors may have substantial, non-zero magnitude horizontal and vertical components, and are all vertical-dominant in direction. However, it will be appreciated that, should one or more of the components of the immediately preceding velocity vectors have had a relatively small magnitude such that neither the vertical component value nor the horizontal component value exceeded a respective threshold for determining a dominant direction of movement, the determination may be equally weighted.

Following section 100c, as discussed above with respect to FIGS. 2A-2D, the input gesture has a horizontal component value that exceeds a threshold value for determining that the dominant direction of movement changes from a vertical-dominant direction to a horizontal-dominant direction. A horizontal velocity component associated with the input gesture increases over the time period $t_9$-$t_{11}$, so the threshold value $TV_y$ required for changing from a horizontal-dominant direction to a vertical-dominant direction is increased accordingly. This relationship is visually represented in the plot shown in FIG. 3B. In particular, as shown, $TV_y$ increases from 1 to 12 over $t_9$-$t_{10}$ and increases from 12 to 15 over the time period $t_{10}$-$t_{11}$. As a result, in order to cause a change in control functions during this period of time, by exceeding the respective threshold value(s), the input gesture would need to be performed in a manner such that the vertical velocity component is greater than it would need to be at, for instance, $t_9$. From time $t_{11}$ to $t_{15}$, the horizontal velocity component associated with the input gesture decreases, so the threshold value $TV_y$ for changing from a horizontal-dominant direction to a vertical-dominant direction is decreased accordingly. In particular, as shown in FIG. 3B, $TV_y$ decreases from 15 to 12 over the time period $t_{11}$-$t_{12}$; decreases from 12 to 7 over the time period $t_{12}$-$t_{13}$; decreases from 7 to 4 over time period $t_{13}$-$t_{14}$; and decreases from 4 to 1 over time period $t_{14}$-$t_{15}$. Therefore, it is made more difficult for a user to accidentally cause a change in control functions from a control function corresponding to a horizontal-dominant direction to a control function corresponding to a vertical-dominant direction.

It should be recognized and appreciated that dynamic adjustment of threshold values according to some example implementations described above may be performed according to various models or patterns, in accordance with various relationships (e.g. mathematical curve, line best fit, plot, etc.), and that aspects of the dynamic adjustment described herein are not limited to any particular types of relationships, patterns, or models discussed herein. Also, it will be appreciated that although shown in FIGS. 3A and 3B as numerical, integer representations, the metrics for threshold values $TV_x$ and/or $TV_y$ are not limited to a specific form of value, unit, or scale. A threshold value as described herein may additionally or alternatively be characterized and considered in terms of ratios, percentages, portions, etc.

Figure 4A:
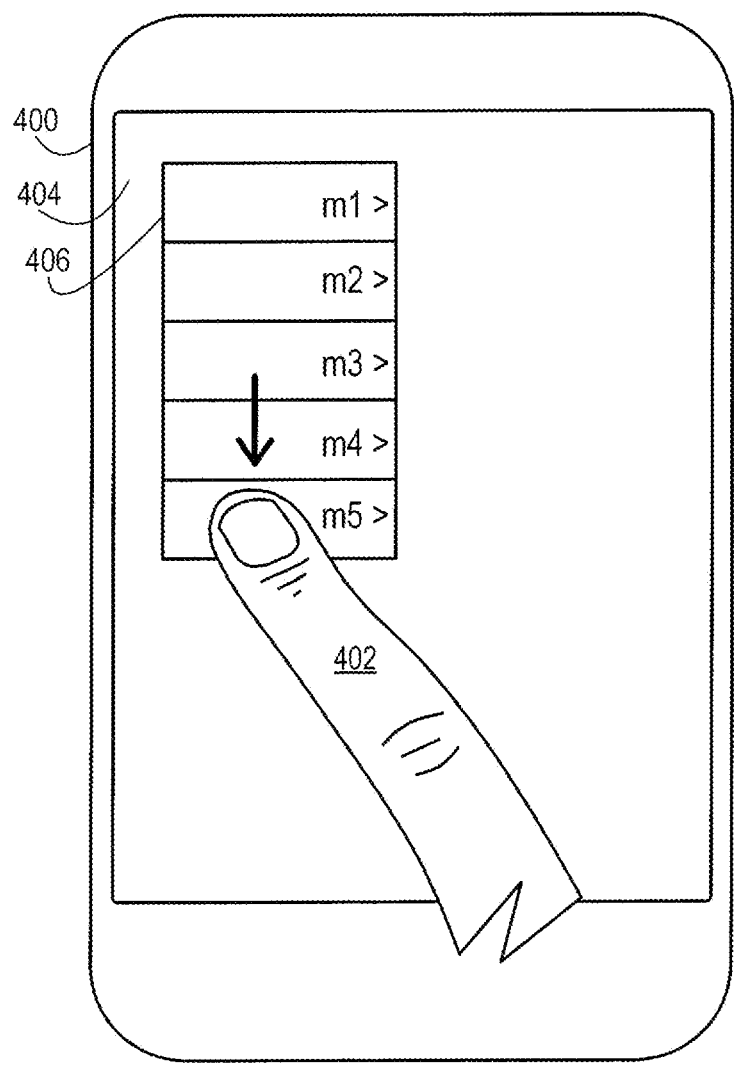
FIGS. 4A-4C illustrate a computing device 400 for performing control functions based to velocity vectors of an input gesture, according to an example implementation.
Figure 4B:
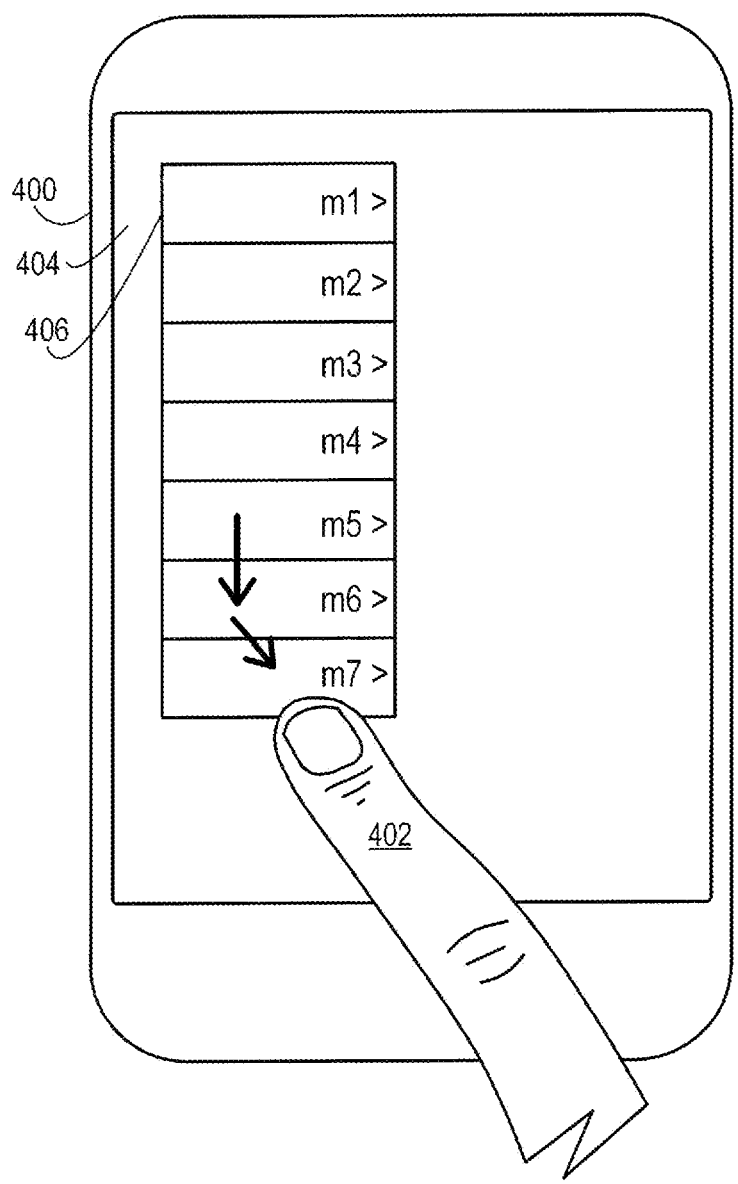
Figure 4C:
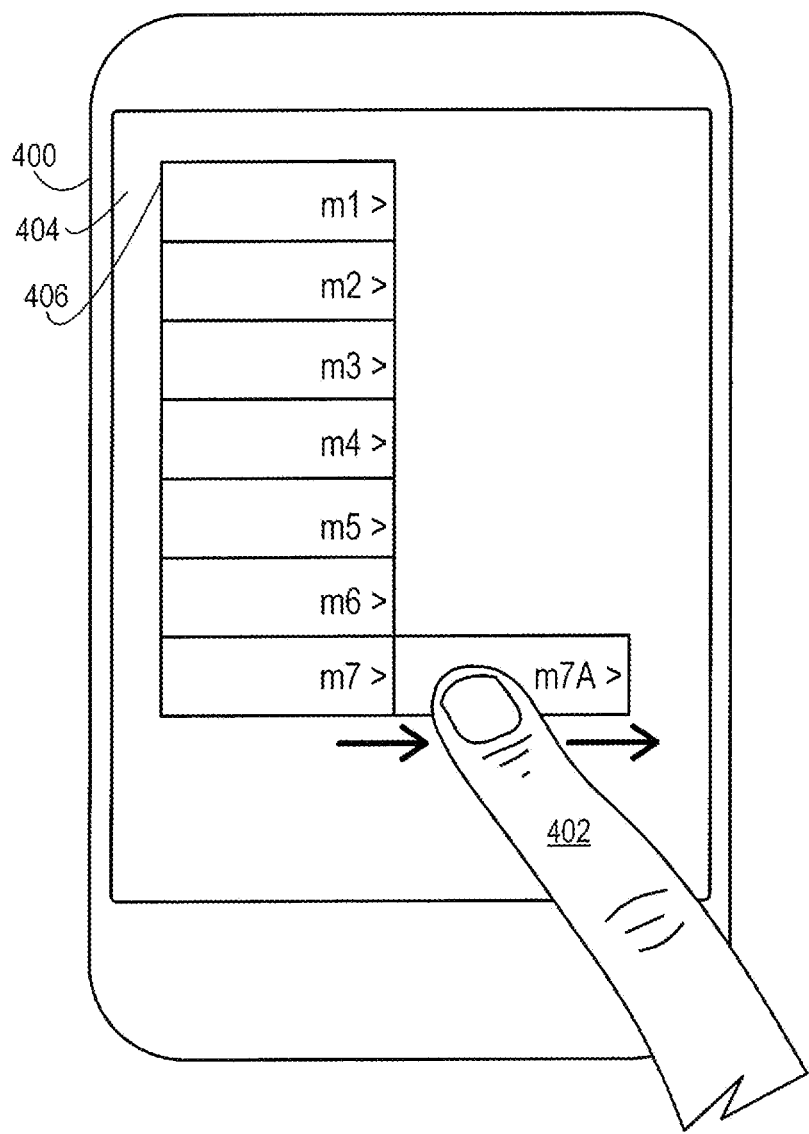

FIGS. 4A-4C illustrate control functions performed according to velocity vectors of an input gesture. A computing device 400 includes a presence-sensitive input device 404 such as a touchscreen or touchpad. The computing device 400 may correspond to the computing device 104 shown in FIG. 1, and input device 404 may correspond to the input device 106 shown in FIG. 1. The computing device 400 may include one or more components of the computing device architecture shown in FIG. 5, and may be configured to perform one or more control functions in response to one or more input gestures performed by a user. In an example implementation, the computing device 400 may be a dedicated control device for allowing a user to remotely control actions performed on a remote computing device, or the computing device 400 may be an electronic communication device such as a smartphone.

As shown in FIGS. 4A and 4B, a user's finger 402 is used as an input object to perform an input gesture for moving vertically through list items $m_1$-$m_7$ in a list 406 of menu items, wherein the progressive display of and selection of the list items is a first control function performed by the computing device 400. As shown in FIG. 4C, the user's finger is used to move horizontally to open up a sub-menu item $m_{7a}$ from $m_7$ by directing the user's finger 402 horizontally and towards the right, wherein the progressive display and selection of the sub-menu item $m_{7a}$ is a second control function performed by the computing device 400. As illustrated in FIG. 4A, the user's finger 402 has moved downwards such that menu items $m_1$-$m_5$ have been progressively added as the user's finger 402 has progressed in a vertically-dominant direction, downwards. As will be further described with respect to FIGS. 4B and 4C, the input gesture is a continuously-moving, uninterrupted input gesture. Therefore, FIG. 4A shows the input gesture over a first period of time, which may correspond to section 100a of the path 100 of the input gesture from $t_1$ to $t_5$. FIG. 4B shows the same input gesture as it has progressed over a second period of time and third period of time, wherein the second period of time is subsequent to and contiguous with the first period of time, and wherein the third period of time is subsequent to and contiguous with the second period of time. The second period of time may correspond to section 100b of the path 100 of the input gesture from $t_5$ to $t_8$ as illustrated in FIGS. 2A and 2B. The third period of time may correspond to section 100c of the path 100 of the input gesture from $t_8$ to $t_9$. FIG. 4C shows the same input gesture as it has further progressed over a fourth period of time that is subsequent to and contiguous with the third period of time. The fourth period of time may correspond to section 100d of the path 100 of the input gesture from $t_9$ to $t_{15}$ as illustrated in FIGS. 2A and 2B.

Aspects of the first control function and/or second function that may be performed by the computing device 400 may correspond to a first control function and/or second control function performed in accordance with aspects described in detail above with respect to example implementations illustrated in FIGS. 1 and 2A-2D. The computing device 400 may determine dominant direction of movement of an input gesture and/or intended changes in direction of movement of an input gesture in accordance with aspects described in detail above with respect to example implementations illustrated in FIGS. 1 and 2A-2D. Further, the computing device 400 may adjust one or more threshold values for determining a user's intended dominant direction of movement, change in direction of movement, and/or control functions in accordance with aspects described in detail above with respect to example implementations illustrated in FIGS. 3A and 3B.

Figure 5:
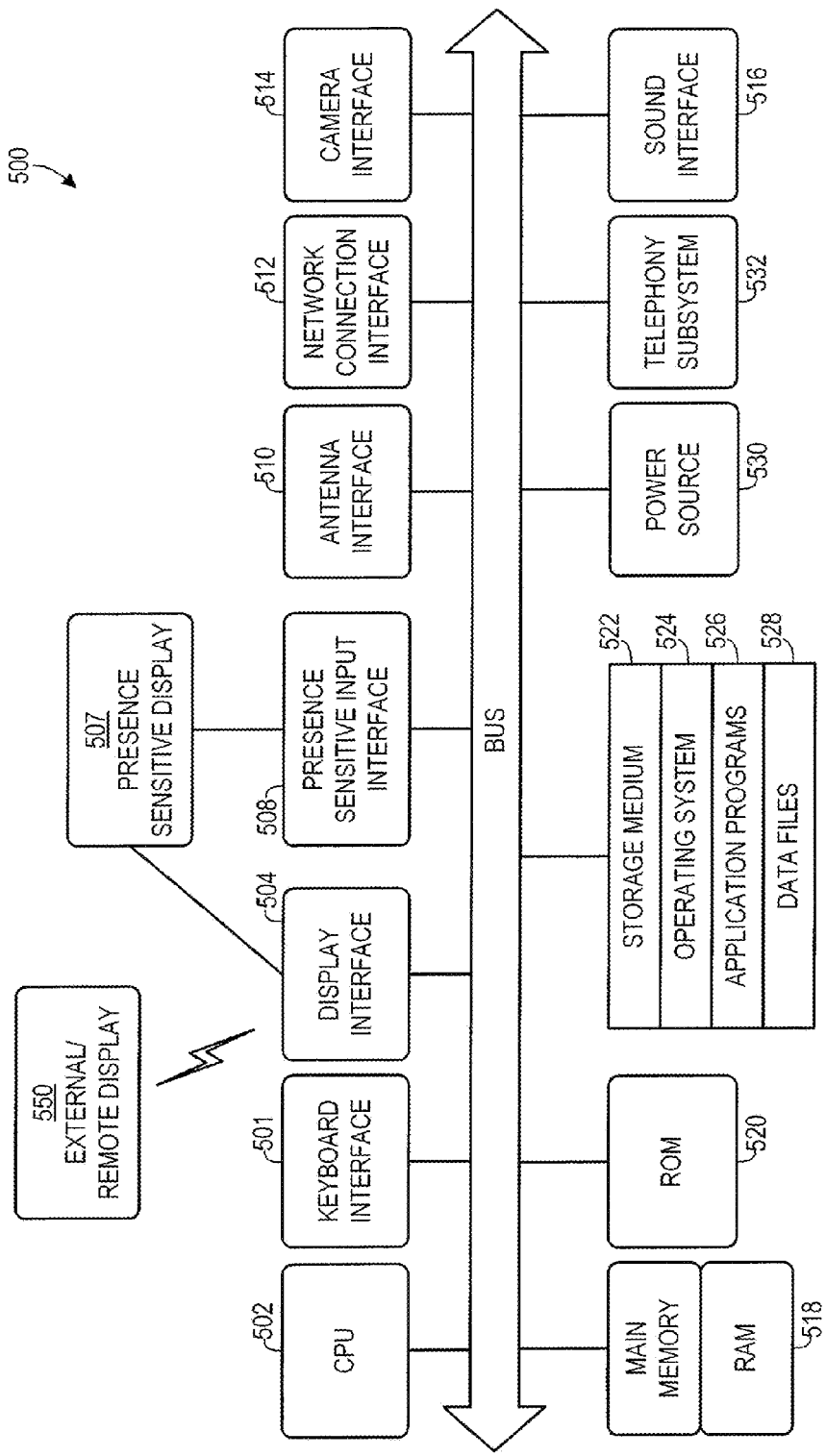
FIG. 5 is a block diagram of an illustrative computer system architecture 500, according to an example implementation.

As desired, implementations of the disclosed technology may include a computing device with more or less of the components illustrated in FIG. 5. It will be understood that the computing device architecture 500 is provided for example purposes only and does not limit the scope of the various implementations of the present disclosed systems, methods, and computer-readable mediums. The computing device architecture 500 of FIG. 5 includes a central processing unit (CPU) 102, where computer instructions are processed; a display interface 504 that acts as a communication interface and provides functions for rendering video, graphics, images, and texts on the display. In certain example implementations of the disclosed technology, the display interface 504 may be directly connected to a local display, such as a touch-screen display associated with a mobile computing device. In another example implementation, the display interface 504 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 504 may wirelessly communicate, for example, via a Wi-Fi channel or other available network connection interface 512 to the external/remote display.

In an example implementation, the network connection interface 512 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 504 may be operatively coupled to a local display, such as a touch-screen display associated with a mobile device. In another example, the display interface 504 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 504 may wirelessly communicate, for example, via the network connection interface 512 such as a Wi-Fi transceiver to the external/remote display.

The computing device architecture 500 may include a keyboard interface 506 that provides a communication interface to a keyboard. In one example implementation, the computing device architecture 500 may include a presence-sensitive display interface 508 for connecting to a presence-sensitive display 507. According to certain example implementations of the disclosed technology, the presence-sensitive display interface 508 may provide a communication interface to various devices such as a pointing device, a touchscreen, a depth camera, etc. which may or may not be associated with a display.

The computing device architecture 500 may be configured to use an input device via one or more of input/output interfaces (for example, the keyboard interface 506, the display interface 504, the presence sensitive display interface 508, network connection interface 512, camera interface 514, sound interface 516, etc.) to allow a user to capture information into the computing device architecture 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

Example implementations of the computing device architecture 500 may include an antenna interface 510 that provides a communication interface to an antenna; a network connection interface 512 that provides a communication interface to a network. As mentioned above, the display interface 504 may be in communication with the network connection interface 512, for example, to provide information for display on a remote display that is not directly connected or attached to the system. In certain implementations, a camera interface 514 is provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random access memory (RAM) 518 is provided, where computer instructions and data may be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device architecture 500 includes a power source 530 that provides an appropriate alternating current (AC) or direct current (DC) to power components. According to an example implementation, the computing device architecture 500 includes and a telephony subsystem 532 that allows the device 500 to transmit and receive sound over a telephone network. The constituent devices and the CPU 502 communicate with each other over a bus 534.

According to an example implementation, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers.

More specifically, the CPU 502 loads computer-executable process steps from the storage medium 522 or other media into a field of the RAM 518 in order to execute software programs. Data may be stored in the RAM 518, where the data may be accessed by the computer CPU 502 during execution. In one example configuration, the device architecture 500 includes at least 528 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 522, which may comprise a machine-readable storage medium.

According to one example implementation, the term computing device, as used herein, may be a CPU, or conceptualized as a CPU (for example, the CPU 502 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone or tablet computer. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touchscreen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 6:
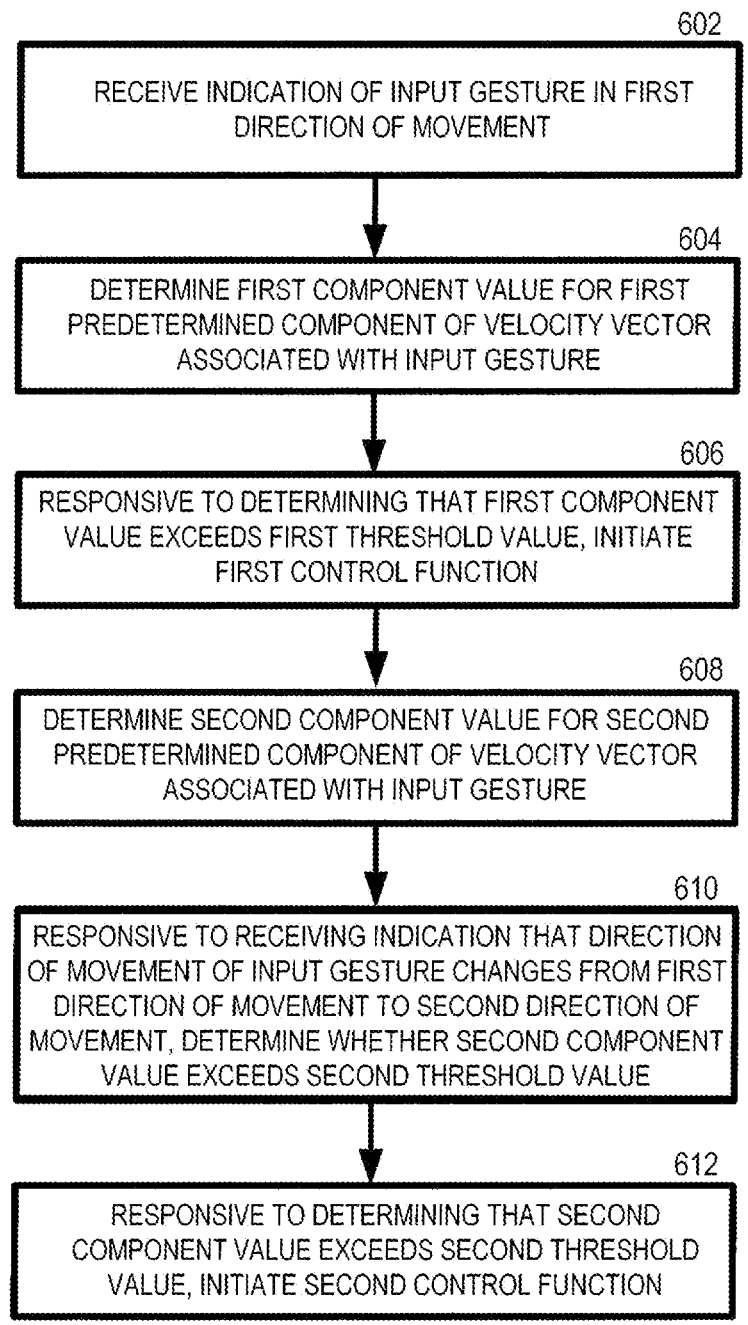
FIG. 6 is a flow diagram of a method 600, according to an example implementation.

FIG. 6 is a flow diagram of a method 600 according to an example implementation. The method 600 may include, responsive to receiving an indication of movement of an input gesture in a first direction of movement, determining a first component value corresponding to a first predetermined component of a velocity vector associated with the input gesture (block 602). The input gesture may include a slide interaction at an input device. The method 600 may also include, responsive to determining that the first component value exceeds a first threshold value associated with a dominant direction of movement, initiating a first control function (block 604). The method 600 may also include determining a second component value corresponding to a second predetermined component of the velocity vector associated with the input gesture (block 606). The method 600 may also include, responsive to receiving an indication that a direction of movement of the input gesture has changed from the first direction of movement to the second direction of movement, determining whether the second component value exceeds a second threshold value associated with movement in a non-dominant direction of movement (block 608), wherein the second threshold value is higher than the first threshold value. The method 600 may also include, responsive to determining that the second component value exceeds the second threshold value, initiating a second control function (block 610).

The first component value and second component value of the velocity of the input gesture may correspond to a horizontal component and vertical component, respectively, of the velocity vector associated with the input gesture. The first control function and/or second control function may include manipulating one or more objects that are output for display on a display device, scrolling functions, selection functions and/or navigation functions for a user interface, for example.

The method 600 may also include, responsive to determining that the first component value of the velocity at a first predetermined time is greater than the first component value at a second predetermined time subsequent to the first predetermined time, reducing the threshold value associated with movement in a non-dominant direction of movement, from the second threshold value to a third threshold value that is less than the second threshold value. The threshold value may be reduced in proportion to a difference between the first component value at the first predetermined time and the first component value at the second predetermined time.

The method 600 may also include, responsive to determining that the first component value at a first predetermined time is less than the first component value at a second predetermined time subsequent to the first predetermined time, increasing the threshold value associated with movement in a non-dominant direction of movement, from the second threshold value to a third threshold value that is greater than the second threshold value. The threshold value⁻ may be increased in proportion to a difference between the first component value at the first predetermined time and the first component value at the second predetermined time.

In an example implementation, determining a user's intended dominant direction of movement and, accordingly, the user's intended control function, may be performed by comparing one component of the velocity vector associated with the input gesture to another component of the velocity vector, rather than requiring a comparison to one or more threshold values. For example, a computing device may determine that the value (or percentage, portion, ratio, etc.) of the velocity vector that is attributable to the horizontal component is greater than the value (or percentage, portion, ratio, etc.) of the velocity vector that is attributable to the vertical component and that, accordingly, the intended direction of movement is horizontal-dominant. The computing device may therefore determine that a user's intended control function corresponds to an input gesture performed in a vertical-dominant direction. Similarly, the computing device may determine that the value (or percentage, portion, ratio, etc.) of the velocity vector that is attributable to the vertical component is greater than the value (or percentage, portion, ratio, etc.) of the velocity vector that is attributable to the horizontal component and that, accordingly, the intended direction of movement is vertical-dominant. The computing device may therefore determine that a user's intended control function corresponds to an input gesture performed in a vertical-dominant direction.

In an example implementation in which the horizontal velocity component and vertical velocity component of an input gesture are compared to one another in order to determine a dominant direction of movement and corresponding control function, or to determine that the dominant direction of movement and corresponding control function should be changed, a component value may be required to exceed the respective other component value by a certain amount, ratio, percentage, etc. For example, one component value may be required to exceed the other component value by 25% in order for the dominant direction and corresponding control function to be determined, or in order for the dominant direction and corresponding control function to be changed from a first dominant direction and corresponding first control function to a second dominant direction and corresponding second control function. For example, if one component of the velocity vector does not differ from the other respective component by a requisite amount, ratio, percentage, etc., then the dominant direction and corresponding control function may remain the same as that determined for one or more velocity vectors at one or more previous points in time during the input gesture.

In an alternative example implementation, rather than determining a user's intended control function based on components of the velocity of the input gesture, an intended control function may be determined based on a distance an input object travels with respect to specific locations of the input device, for instance a distance an input object travels horizontally (i.e., along the x-axis) versus the distance the input object travels vertically (i.e., along the y-axis) over a predetermined amount of distance and/or time. For example, if an input gesture is performed at 30 degrees with respect to the x-axis, then over a predetermined amount of distance, such as a predetermined number of pixels on a touchscreen input device from one location of the input device to another, the distance traveled along the x-axis may be greater than the distance traveled along the y-axis. Similarly, if an input gesture is performed at 70 degrees with respect to the x-axis, then over the predetermined amount of distance from the location where the input gesture begins, the distance traveled along the y-axis may be greater than the distance traveled along the x-axis. Alternatively or additionally, a user's intended control function may be determined based on a distance traveled along the x-axis over a predetermined period of time compared to the distance traveled along the y-axis over the same predetermined period of time.

In some example implementations described herein, directions of movement associated with input gestures are discussed with respect to perpendicular x- and y-axes. It should be appreciated, however, that directions of movement may be considered in relation to axes that are not completely vertical or horizontal and axes that are not orthogonally related. For instance, the directions of movement may be considered with respect to axes that are greater than or less than 90 degrees relative to one another, or with respect to one or more radial axes. Furthermore, although some example implementations described herein are discussed in terms of two-dimensional movements, it should be appreciated that the directions of movement associated with input gestures described herein may be characterized and considered in three dimensions (i.e., with respect to x-, y-, and z-axes and corresponding component values).

Although input gestures described in some example implementations herein include a slide gesture, it will be appreciated that an input gesture may include other types of interactions associated with any type of directional movement. Further, it will be appreciated that an input gesture does not necessarily require direct contact with an input device, such as when a user's finger drags along the surface of a touchscreen or touchpad input device. Rather, an input object may move proximate to the input device without direct contact, for example, through motions in which the input object "hovers" proximate to, but does not contact, the input device. Accordingly, the use of "presence-sensitive input device" herein may refer to an input device that may generate a signal based on direct contact with an input object or through detecting a nearby presence of an input object.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
responsive to receiving, at a computing device, an indication of an input gesture in a first direction of movement, determining, by the computing device, a first component value corresponding to a first predetermined component of a velocity vector associated with the input gesture;
responsive to determining, by the computing device, that the first component value exceeds a first threshold value associated with a dominant direction of movement, initiating, by the computing device, a first control function;
determining, by the computing device, a second component value corresponding to a second predetermined component of the velocity vector associated with the input gesture;
responsive to receiving, at the computing device, an indication that the input gesture has changed from the first direction of movement to a second direction of movement, determining, by the computing device, that the second component value exceeds a second threshold value associated with movement in a non-dominant direction of movement, wherein the second threshold value is higher than the first threshold value;

responsive to determining, by the computing device, that the second component value exceeds the second threshold value, initiating, by the computing device, a second control function; and responsive to determining, by the computing device, that the first component value is less at a first predetermined time than at a second predetermined time subsequent to the first predetermined time, increasing the threshold value associated with movement in a non-dominant direction of movement, from the second threshold value to a third threshold value that is greater than the second threshold value.

2. The method of claim 1, wherein the first predetermined component of the velocity vector is a horizontal component.

3. The method of claim 1, wherein the second predetermined component of the velocity vector is a vertical component.

4. The method of claim 1, further comprising:

responsive to determining, by the computing device, that the first component value is greater at a first predetermined time than at a second predetermined time subsequent to the first predetermined time, reducing the threshold value associated with movement in a non-dominant direction of movement, from the second threshold value to a threshold value that is less than the second threshold value.

5. The method of claim 4, wherein reducing the threshold value associated with movement in the non-dominant direction of movement comprises reducing the threshold value associated with movement in the non-dominant direction in proportion to a difference between the first component value at the first predetermined time and the first component value at the second predetermined time.

6. The method of claim 1, wherein increasing the threshold value associated with movement in the non-dominant direction of movement comprises increasing the threshold value associated with movement in the non-dominant direction in proportion to a difference between the first component value at the first predetermined time and the first component value at the second predetermined time.

7. The method of claim 1, wherein the input gesture comprises a slide interaction at an input device associated with the computing device.

8. The method of claim 1, wherein at least one of the first control function and second control function includes manipulating one or more objects that are output for display on a display device.

9. The method of claim 1, wherein at least one of the first control function and second control function includes at least one of a scrolling function, selection function, and navigation function.

10. A system, comprising:
one or more processors; and
a memory coupled to the one or more processors, storing instructions that, when executed by the one or more processors, cause the system to:
responsive to receiving an indication of an input gesture in a first direction of movement, determine a first component value corresponding to a first predetermined component of a velocity vector associated with the input gesture;
responsive to determining that the first component value exceeds a first threshold value associated with a dominant direction of movement, initiate a first control function;
determine a second component value corresponding to a second predetermined component of the velocity vector associated with the input gesture;
responsive to receiving an indication that the input gesture has changed from the first direction of movement to a second direction of movement, determine that the second component value exceeds a second threshold value associated with movement in a non-dominant direction of movement, wherein the second threshold value is higher than the first threshold value;
responsive to determining that the second component value exceeds the second threshold value, initiate a second control function; and
responsive to determining that the first component value is less at a first predetermined time than at a second predetermined time subsequent to the first predetermined time, increase the threshold value associated with movement in a non-dominant direction of movement, from the second threshold value to a third threshold value that is greater than the second threshold value.

11. The system of claim 10, wherein the first predetermined component of the velocity vector is a horizontal component.

12. The system of claim 10, wherein the second predetermined component of the velocity vector is a vertical component.

13. The system of claim 10, wherein the memory stores further instructions that, when executed by the one or more processors, cause the system to:
responsive to determining that the first component value is greater at a first predetermined time than at a second predetermined time subsequent to the first predetermined time, reduce the threshold value associated with movement in a non-dominant direction of movement, from the second threshold value to a threshold value that is less than the second threshold value.

14. The system of claim 13, wherein reducing the threshold value associated with movement in the non-dominant direction of movement comprises reducing the threshold value associated with movement in the non-dominant direction in proportion to a difference between the first component value at the first predetermined time and the first component value at the second predetermined time.

15. The system of claim 10, wherein increasing the threshold value associated with movement in the non-dominant direction of movement comprises increasing the threshold value associated with movement in the non-dominant direction in proportion to a difference between the first component value at the first predetermined time and the first component value at the second predetermined time.

16. The system of claim 10, wherein the input gesture comprises a slide interaction at an input device associated with the computing device.

17. The system of claim 10, wherein at least one of the first control function and second control function includes manipulating one or more objects that are output for display on a display device.

18. The system of claim 10, wherein at least one of the first control function and second control function includes at least one of a scrolling function, selection function, and navigation function.

19. A non-transitory computer-readable medium storing instructions that, when executed by one or more processors, cause a computing device to:

responsive to receiving an indication of an input gesture in a first direction of movement, determine a first component value corresponding to a first predetermined component of a velocity vector associated with the input gesture;

responsive to determining that the first component value exceeds a first threshold value associated with a dominant direction of movement, initiate a first control function;

determine a second component value corresponding to a second predetermined component of the velocity vector associated with the input gesture;

responsive to receiving an indication that the input gesture has changed from the first direction of movement to a second direction of movement, determine that the second component value exceeds a second threshold value associated with movement in a non-dominant direction of movement, wherein the second threshold value is higher than the first threshold value;

responsive to determining that the second component value exceeds the second threshold value, initiate a second control function; and responsive to determining that the first component value is less at a first predetermined time than at a second predetermined time subsequent to the first predetermined time, increase the threshold value associated with movement in a non-dominant direction of movement, from the second threshold value to a third threshold value that is greater than the second threshold value.

20. The non-transitory computer-readable medium of claim 19, wherein the first predetermined component of the velocity vector is a horizontal component.

21. The non-transitory computer-readable medium of claim 19, wherein the second predetermined component of the velocity vector is a vertical component.

22. The non-transitory computer-readable medium of claim 19, storing further instructions that, when executed by the one or more processors, cause the computing device to:

responsive to determining that the first component value is greater at a first predetermined time than at a second predetermined time subsequent to the first predetermined time, reduce the threshold value associated with movement in a non-dominant direction of movement, from the second threshold value to a threshold value that is less than the second threshold value.

23. The non-transitory computer-readable medium of claim 22, wherein reducing the threshold value associated with movement in the non-dominant direction of movement comprises reducing the threshold value associated with movement in the non-dominant direction in proportion to a difference between the first component value at the first predetermined time and the first component value at the second predetermined time.

24. The non-transitory computer-readable medium of claim 19, wherein increasing the threshold value associated with movement in the non-dominant direction of movement comprises increasing the threshold value associated with movement in the non-dominant direction in proportion to a difference between the first component value at the first predetermined time and the first component value at the second predetermined time.

25. The non-transitory computer-readable medium of claim 19, wherein the input gesture comprises a slide interaction at an input device associated with the computing device.

26. The non-transitory computer-readable medium of claim 19, wherein at least one of the first control function and second control function includes manipulating one or more objects that are output for display on a display device.

27. The non-transitory computer-readable medium of claim 19, wherein at least one of the first control function and second control function includes at least one of a scrolling function, selection function, and navigation function.

* * * * *